(12) United States Patent
Takemoto

(10) Patent No.: US 7,333,136 B2
(45) Date of Patent: Feb. 19, 2008

(54) IMAGE PROCESSING APPARATUS FOR CARRYING OUT TONE CONVERSION PROCESSING AND COLOR CORRECTION PROCESSING USING A THREE-DIMENSIONAL LOOK-UP TABLE

(75) Inventor: Fumito Takemoto, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 643 days.

(21) Appl. No.: 09/842,771

(22) Filed: Apr. 27, 2001

(65) Prior Publication Data

US 2002/0008762 A1   Jan. 24, 2002

(30) Foreign Application Priority Data

Apr. 28, 2000 (JP) ............................. 2000-130738
Mar. 28, 2001 (JP) ............................. 2001-091707

(51) Int. Cl.
H04N 5/228 (2006.01)
(52) U.S. Cl. .................................. 348/222.1
(58) Field of Classification Search ............. 348/222.1; 358/518, 501, 3.21; 382/167; 355/38
See application file for complete search history.

(56) References Cited

U.S. PATENT DOCUMENTS

| 5,489,996 A * | 2/1996 | Oku et al. ................... 358/518 |
| 5,592,312 A * | 1/1997 | Noguchi ...................... 358/525 |
| 5,805,213 A * | 9/1998 | Spaulding et al. ........ 348/222.1 |
| 5,883,698 A * | 3/1999 | Kimura ........................ 355/38 |
| 5,917,578 A * | 6/1999 | Nakamura .................... 355/40 |
| 5,974,173 A * | 10/1999 | Kimura ...................... 382/167 |
| 6,184,915 B1 * | 2/2001 | Atsumi et al. .............. 347/251 |
| 6,590,678 B1 * | 7/2003 | Nishigaki et al. ........... 358/501 |
| 6,717,700 B1 * | 4/2004 | Sanderson et al. ......... 358/3.21 |

FOREIGN PATENT DOCUMENTS

JP   11234523   8/1999

* cited by examiner

Primary Examiner—James M. Hannett
(74) Attorney, Agent, or Firm—Birch, Stewart, Kolasch & Birch, LLP

(57) ABSTRACT

When tone conversion processing and color correction processing is carried out on image data obtained by a digital camera, processed image data enabling reproduction of a high quality image can be obtained. A 3DLUT for carrying out the tone conversion processing and the color correction processing on the image data obtained by the digital camera is generated. The image data are converted according to the 3DLUT, and subjected to sharpness processing to generate the processed image data. The processed image data are printed as a print by a printer.

12 Claims, 9 Drawing Sheets

| REFERENCE COLOR CORRECTION CONDITION SETTING MENU | | | |
|---|---|---|---|
| | L | C | H |
| R | 0 | -5 | -3 |
| G | 0 | 0 | 0 |
| B | 0 | 0 | 0 |
| C | 0 | 0 | 0 |
| M | 0 | 0 | 0 |
| Y | 0 | 0 | 0 |
| YG | 0 | 0 | 0 |
| BS | 0 | 0 | 0 |
| SK(HL) | 0 | 0 | 0 |
| SK(MD) | 0 | 0 | 0 |
| SK(SD) | 0 | 0 | 0 |

| MODEL COLOR CORRECTION CONDITION SETTING MENU | | | |
|---|---|---|---|
| | L | C | H |
| R | 0 | -2 | -5 |
| G | 0 | 0 | 0 |
| B | 0 | -3 | 0 |
| C | 0 | 0 | 0 |
| M | 0 | 0 | 0 |
| Y | 0 | 3 | 0 |
| YG | 0 | 0 | 0 |
| BS | 0 | 0 | 10 |
| SK(HL) | 0 | 0 | 0 |
| SK(MD) | 0 | 0 | 0 |
| SK(SD) | 0 | 0 | 0 |

FIG.8

| POINT A | 0 | 5 | 0 |
|---------|---|-----|---|
| POINT B | 0 | -5 | 0 |

IMAGE PROCESSING APPARATUS FOR CARRYING OUT TONE CONVERSION PROCESSING AND COLOR CORRECTION PROCESSING USING A THREE-DIMENSIONAL LOOK-UP TABLE

BACKGROUND OF THE INVENTION

1. Field of the Invention

The present invention relates to an image processing method and an image processing apparatus for carrying out tone conversion processing and color correction processing on digital image data obtained by a digital camera. The present invention also relates to a computer-readable recording medium storing a program to cause a computer to execute the image processing method.

2. Description of the Related Art

In a digital still camera (hereinafter called digital camera), an image obtained by photographing is recorded as digital image data in an internal memory installed in the camera or in a recording medium such as an IC card, and the image can be displayed by using a monitor or a printer based on the recorded digital image data. When an image obtained by a digital camera is printed, the image is expected to have as high a quality as a photograph generated from a negative film.

Meanwhile, in the field of printing, a system for outputting an image as a hard copy from a printer by reading a color image with a scanner to obtain input image data and by carrying out a desired kind of image processing on the input image data to generate output image data has been put into practice (Japanese Unexamined Patent Publication No. 11(1999)-234523, for example). In such a system, the input image data are converted from RGB color signals into CMYK dot % signals. First, a tone curve (a tone conversion table) and a color correction amount used in a color correction unit and the like are set for the input image data, and a three-dimensional look-up table (hereinafter called 3DLUT) for converting the input image data into the output image data is generated based on the tone curve and the color correction amount that have been set. The RGB color signals of the input image data are converted into the CMYK dot % signals of the output image data by interpolating the 3DLUT. Printing is carried out by controlling an amount of ink of each color by the dot % signal.

Meanwhile, tone conversion and color correction is also carried out when image data obtained by a digital camera are printed. As in the system for printing, conditions for the tone conversion and the color correction are also set for each image, and reproduction of a high quality image is also expected.

SUMMARY OF THE INVENTION

The present invention has been conceived based on consideration of the above problem. An object of the present invention is therefore to provide an image processing method and an image processing apparatus for obtaining processed image data having a higher quality by carrying out tone conversion processing and color correction processing on image data obtained by a digital camera, and to provide a computer-readable recording medium storing a program to cause a computer to execute the image processing method.

A first image processing method of the present invention is a method for obtaining processed image data by carrying out tone conversion processing and color correction processing on image data obtained by a digital camera, and the image processing method comprises the steps of:

generating a three-dimensional look-up table for carrying out the tone conversion processing and the color correction processing on the image data; and obtaining the processed image data by converting the image data according to the three-dimensional look-up table.

In the first image processing method of the present invention, it is preferable for the three-dimensional look-up table to be generated for a model of the digital camera.

In a digital camera, tone processing, automatic exposure control processing (AE processing) and automatic white balance processing (AWB processing) is carried out on image data obtained by the camera. Therefore, generating "the three-dimensional look-up table for a model of the digital camera" refers to generating the three-dimensional look-up table enabling elimination of an effect of tone processing carried out in the digital camera.

A three-dimensional look-up table has a predetermined number of lattice points. However, it is preferable for the number of lattice points in the three-dimensional look-up table of the present invention to be set in accordance with the number of bits of the image data.

If the number of lattice points of the three-dimensional look-up table is the same as the number of bits of the image data (for example, $256^3$ in the case where the image data comprise RGB data having 8 bits each), operation time for generating the look-up table becomes long. On the other hand, if the number of lattice points is too small, accuracy of operation for interpolating the lattice points may be lowered at the time of converting the image data. Therefore, setting "the number of lattice points in accordance with the number of bits" refers to setting the operation time for calculating the three-dimensional look-up table and the accuracy of the operation for interpolating the lattice points. For example, in order to improve the accuracy according to the number of bits of the image data, the number of the lattice points is set to $(2^n/8+1)$ where n is the number of bits of the image data.

Furthermore, in the first image processing method of the present invention, it is preferable for the number of pixels in an image represented by the image data to be compared with the number of the lattice points in the three-dimensional look-up table. In this case, the processed image data are obtained by generating the three-dimensional look-up table and by converting the image data according to the look-up table in the case where the number of the pixels is larger than the number of the lattice points; and by carrying out the tone conversion processing and the color correction processing on each of the pixels in the image represented by the image data in the case where the number of the pixels is equal to or smaller than the number of the lattice points.

"Carrying out the tone conversion processing and the color correction processing on each of the pixels" refers to carrying out the tone conversion processing and the color correction processing on each of the pixels according to a predetermined operational expression and not using the three-dimensional look-up table.

It is preferable for the image data to have a file format having tag information, such as Exif or JPEG. In this case, it is preferable for the number of bits of the image data and the number of the pixels to be described in the tag information.

A second image processing method of the present invention is a method for obtaining processed image data by carrying out tone conversion processing and color correction processing on image data, and the method comprises the steps of:

comparing the number of lattice points in a three-dimensional look-up table used for carrying out the tone conversion processing and the color correction processing on the image data with the number of pixels in an image represented by the image data;

generating the three-dimensional look-up table and obtaining the processed image data by converting the image data according to the three-dimensional look-up table in the case where the number of the pixels is larger than the number of the lattice points; and obtaining the processed image data by carrying out the tone conversion processing and the color correction processing on each of the pixels in the image represented by the image data, in the case where the number of the pixels is equal to or smaller than the number of the lattice points.

In the second image processing method of the present invention, it is preferable for the number of the lattice points in the three-dimensional look-up table to be set according to the number of bits of the image data.

A first image processing apparatus of the present invention is an apparatus for obtaining processed image data by carrying out tone conversion processing and color correction processing on image data obtained by a digital camera, and the apparatus comprises:

three-dimensional look-up table generating means for generating a three-dimensional look-up table used for carrying out the tone conversion processing and the color correction processing on the image data; and processing means for obtaining the processed image data by converting the image data according to the three-dimensional look-up table.

It is preferable for the three-dimensional look-up table generating means of the first image processing apparatus of the present invention to generate the three-dimensional look-up table according to a model of the digital camera.

It is also preferable for the three-dimensional look-up table generating means to set the number of lattice points of the three-dimensional look-up table according to the number of bits of the image data.

Furthermore, it is preferable for the three-dimensional look-up table generating means to compare the number of pixels of an image represented by the image data with the number of lattice points in the three-dimensional look-up table. If the number of the pixels is larger than the number of the lattice points, the three-dimensional look-up table generating means generates the three-dimensional look-up table, and the processing means obtains the processed image data by converting the image data according to the three-dimensional look-up table. On the other hand, if the number of the pixels is equal to or smaller than the number of the lattice points, the processing means obtains the processed image data by carrying out the tone conversion processing and the color correction processing on each of the pixels of the image represented by the image data.

A second image processing apparatus of the present invention is an apparatus for obtaining processed image data by carrying out tone conversion processing and color correction processing on image data, and the second image processing apparatus comprises:

three-dimensional look-up table generating means for comparing the number of lattice points in a three-dimensional look-up table used for the tone conversion processing and the color correction processing on the image data with the number of pixels in an image represented by the image data, and for generating the three-dimensional look-up table in the case where the number of the pixels is larger than the number of the lattice points; and processing means for obtaining the processed image data by converting the image data according to the three-dimensional look-up table in the case where the number of the pixels is larger than the number of the lattice points, and for obtaining the processed image data by carrying out the tone conversion processing and the color correction processing on each of the pixels in the image represented by the image data, in the case where the number of the pixels is equal to or smaller than the number of the lattice points.

In the second image processing apparatus of the present invention, it is preferable for the three-dimensional look-up table generating means to set the number of the lattice points in the three-dimensional look-up table according to the number of bits of the image data.

The image processing methods of the present invention may be provided as a computer-readable recording medium storing programs to cause a computer to execute the image processing methods.

According to the present invention, the three-dimensional look-up table used for carrying out tone conversion processing and color correction processing on the image data obtained by the digital camera is generated, and the processed image data are obtained by converting the image data according to the table. Therefore, appropriate tone conversion processing and color correction processing can be carried out, and the processed image data enabling reproduction of a high-quality image can be obtained.

Furthermore, by generating the three-dimensional look-up table for the model of the digital camera, the processed image data enabling reproduction of a high-quality image without an effect of tone processing in the digital camera can be obtained, regardless of the model of the digital camera.

Moreover, by determining the number of the lattice points in the three-dimensional look-up table according to the number of bits of the image data, operation time for generating the three-dimensional look-up table and accuracy of operation for interpolating the lattice points at the time of image data conversion can be controlled. In this manner, the image data can be converted quickly or accurately.

In the case where the number of the pixels in the image represented by the image data is larger than the number of the lattice points in the three-dimensional look-up table, the three-dimensional look-up table is generated, and the processed image data are obtained by converting the image data according to the three-dimensional look-up table. On the other hand, if the number of the pixels is equal to or smaller than the number of the lattice points, the processed image data are obtained by carrying out the tone conversion processing and the color correction processing on each of the pixels. In this manner, the tone conversion processing and the color correction processing can be carried out on the image data by a smaller amount of calculation.

BRIEF DESCRIPTION OF THE DRAWINGS

FIG. 8 shows an additional color correction condition setting menu; and

DESCRIPTION OF THE PREFERRED EMBODIMENT

Figure 1:
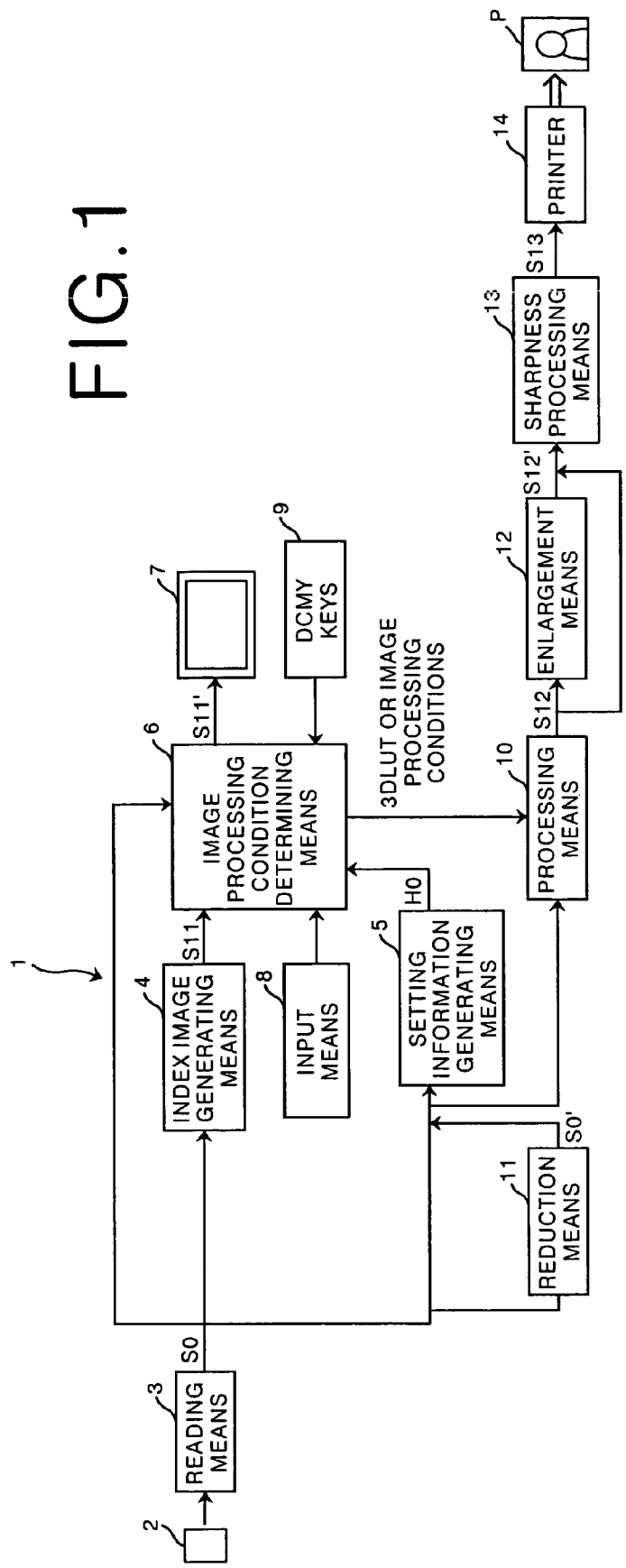
FIG. 1 is a block diagram showing a configuration of an image output apparatus comprising an image processing apparatus as an embodiment of the present invention.

Hereinafter, an embodiment of the present invention will be explained with reference to the accompanying drawings. FIG. 1 is a block diagram showing a configuration of an image output apparatus adopting an image processing apparatus as the embodiment of the present invention. As shown in FIG. 1, an image output apparatus 1 in this embodiment comprises reading means 3 for reading, from a memory card 2, image data S0 comprising color data R0, G0, and B0 obtained by photographing a subject with a digital camera, index image generating means 4 for generating index image data S11 representing index images by reducing the image data S0, setting information generating means 5 for generating setting information H0 necessary for setting tone conversion tables T0 which will be explained later by analyzing the image data S0, image processing condition determining means 6 for setting image processing conditions used for carrying out tone conversion processing and color correction processing on the image data S0 upon printing the image data S0 and for carrying out tone conversion processing on the index image data S11, a monitor 7 for displaying index image data S11' after the tone conversion processing as index images, input means 8 for carrying out various kinds of inputs to the image processing condition determining means 6, DCMY keys 9 for changing density, processing means 10 for obtaining converted image data S12 by converting the image data S0 according to a 3DLUT or the image processing conditions generated or set by the image processing condition determining means 6, reduction means 11 for obtaining reduced image data S0' by reducing the image data S0 in the case where the number of pixels of an image represented by the image data S0 is larger than the number of pixels necessary for printing the image, enlargement means 12 for obtaining enlarged image data S12' by enlarging the converted image data S12 in the case where the number of the pixels of the image data S0 is equal to or smaller than the number of the pixels necessary for printing, sharpness processing means 13 for obtaining processed image data S13 by carrying out sharpness processing on the converted image data S12 or on the enlarged image data S12', and a printer 14 for obtaining a print P by outputting the processed image data S13.

In the following explanation, processing is carried out on the reduced image data S0' in the case where the image data S0 are reduced by the reduction means 11. However, for the sake of simplicity, the processing is carried out only on the image data S0 in the explanation below, and explanation regarding the processing on the reduced image data S0' is omitted.

The reading means 3 comprises a card reader and the like for reading the image data S0 from the memory card 2. Since the image data read from the memory card 2 are generally compressed, the reading means 3 comprises decompression means not shown, and the image data S0 are obtained by decompressing the image data read from the memory card 2 by using the decompression means. Information indicating a model of the digital camera that obtained the image data S0 (hereinafter called camera model information) is added to the image data S0 as tag information thereof. Therefore, the camera model information is also read. As a standard for recording the camera model information as the tag information, "Baseline TIFF Rev.6.0 RGB Full Color Image" adopted as a non-compressed file format of an Exif file can be used, for example. In the case where the image data S0 do not have the camera model information, the camera model information can be input manually from the input means 8.

The index image generating means 4 reduces the image data S0 by thinning or the like, and generates the index image data S11.

The setting information generating means 5 generates the setting information H0 in the following manner. In general, automatic exposure control processing (AE processing) and automatic white balance processing (AWB processing is carried out in a digital camera for reproduction of image data on a monitor. However, in the case where the image data are reproduced by a printer, the AE processing and the AWB processing (hereinafter called AE/AWB processing) carried out in the digital camera is not sufficient. Therefore, AE/AWB processing appropriate for printing is necessary. The setting information generating means 5 estimates a correction amount necessary for AE/AWB processing optimal for printing for each of RGB color signals comprising the image data S0. The correction amount is included in the setting information H0. For this reason, an average of each of the RGB color signals comprising the image data S0 is found as described in Japanese Unexamined Patent Publication No. 11(1999)-220619, and a correction value is determined so that the average becomes a target value appropriate for printing. The correction value is included as the correction amount in the setting information H0 and output. The correction amount is for correcting exposure and white balance.

The setting information generating means 5 finds a correction amount used for correcting highlight and shadow of tones into a nonlinear form when the image processing condition determining means 6 determines the image processing conditions that will be explained later. This correction amount is also included in the setting information H0. A printer generally has a narrow density reproduction range, and colors easily become evenly bright in a highlight portion and evenly dark in a shadow portion of an image. Therefore, as described in Japanese Unexamined Patent Publication No. 11(1999)-331596, the setting information generating means 5 finds the correction amount to harden tones of the highlight portion and soften tones of the shadow portion, in the case where density of the print increases by the AE processing or the AWB processing. On the contrary, in the case where the density decreases in the print, the setting information generating means 5 finds the correction amount so that the tones of the highlight portion are softened and the tones of the shadow portion are hardened. The correction amount is also included in the setting information H0.

The setting information generating means 5 reads the tag information of the image data S0, and includes the camera model information of the tag information and the number of pixels (hereinafter called Y0) of the image represented by the image data S0 in the setting information H0. In the case where flash information is included in the tag information, the flash information is also included in the setting information H0.

The monitor 7 displays the index images represented by the index image data S11'. At the time of correcting tone curves and color correction conditions that will be explained later, the tone curves and the color correction conditions are also displayed on the monitor together with the index images. In this embodiment, the number of the index images displayed simultaneously is six.

The input means 8 comprises a keyboard and a mouse for carrying out various kinds of inputs to the image processing condition determining means 6. A type of tones used as a reference at the time of determining the image processing conditions (hereinafter called reference tones) is input from the input means 8. The reference tones refer to tones for carrying out tone conversion processing on the image data to cause the print P to have appropriate tones when printing is carried out by the printer 14. As the reference tones, tones for a standard situation, tones for cloudy weather, tones for backlight, and tones for flash photographing are selectable. By selection of one of the types of the reference tones input from the input means 8, the image processing condition determining means 6 sets a reference tone curve representing the selected reference tones. If correction of the tone curves including the reference tone curve is needed to obtain desired tones, the tone curves are shown on the monitor 7 and corrected by an input from the input means 8.

The DCMY keys 9 comprise four keys for correcting density D of the entire image and for correcting densities of cyan (C) magenta (M) and yellow (Y), respectively. Depending on how many times each of these keys is pressed down, the density of the entire image or each of the colors can be changed by the image processing condition determining means 6. Correction of the reference tone curve representing the reference tones input from the input means 8 and the change of the densities input from the DCMY keys 9 are reflected in the index images displayed on the monitor 7 in real time.

The image processing condition determining means 6 sets the image processing conditions for carrying out the tone conversion processing and the color correction processing on the image data S0. Depending on the number Y0 of the pixels in the image represented by the image data S0 included in the tag information of the image data S0, the image processing condition determining means 6 outputs to the processing means 10 either the image processing conditions as they are, or the 3DLUT generated therein based on the image processing conditions. In the image output apparatus in this embodiment, the image processing condition determining means 6 compares the number Y0 with the number of lattice points in the 3DLUT, in order to shorten processing time. In the case where the number Y0 of the pixels is larger than the number of the lattice points, the 3DLUT is generated and output as the image processing conditions to the processing means 10. On the other hand, if the number Y0 of the pixels is equal to or smaller than the number of the lattice points, the image processing conditions are output to the processing means 10 as they are, and the 3DLUT is not generated. Hereinafter, the image processing condition determining means 6 will be explained in detail, with reference to FIG. 2.

Figure 2:
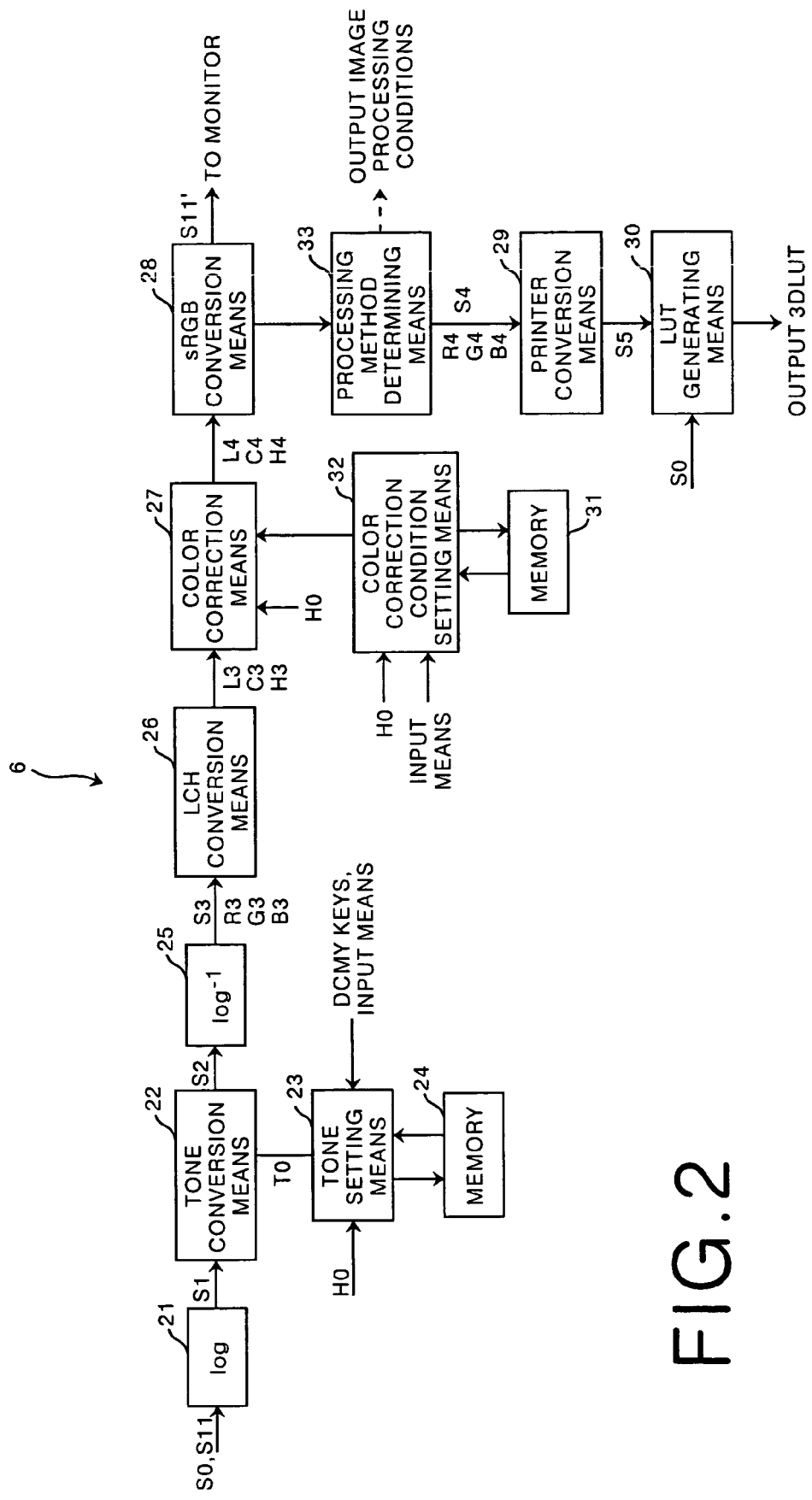
FIG. 2 is a block diagram showing a configuration of image processing condition determining means.

FIG. 2 is a block diagram showing a configuration of the image processing condition determining means 6. In the case where the image data S0 comprise 8-bit RGB color data upon generating the 3DLUT, $256^3$ data will be necessary for the 3DLUT if all the data are to be converted. Consequently, generation of the 3DLUT becomes time-consuming. Therefore, in this embodiment, the 3DLUT is generated by reducing the number of bits of each of the color data R0, G0, and B0 so that the number of the lattice points becomes ($2^n/8+1$) where n is the number of bits of the image data S0. For example, in the case where the image data S0 comprise the RGB color data having 8 bits each, the number of bits of each of the color data is reduced to generate the 3DLUT comprising $33^3$ lattice points having 33 data for each color, namely 0, 7, 15, . . . , 247 and 255.

As shown in FIG. 2, the image processing condition determining means 6 comprises logarithmic conversion means 21 for obtaining image data S1 by carrying out logarithmic conversion on antilogarithmic color data R0', G0', and B0' representing colorimetric values of the subject itself and found from the image data S0 (having the reduced number of bits) according to ITU-R BT.709 (REC. 709) by using Equations (1)~(3) below, tone conversion means 22 for obtaining image data S2 by carrying out the tone conversion processing on the image data S1 after the logarithmic conversion, tone setting means 23 for setting the tone conversion tables T0 used for the tone conversion by the tone conversion means 22, a memory 24 storing a plurality of tone curves, inverse logarithmic conversion means 25 for obtaining image data S3 comprising color data R3, G3, and B3 by carrying out inverse logarithmic conversion on the image data S2, LCH conversion means 26 for converting the color data R3, G3, and B3 comprising the image data S3 into data L3, C3 and H3 representing lightness L*, chroma C*, and hue angle HA, color correction means 27 for obtaining color corrected data L4, C4, and H4 by carrying out the color correction processing on the data L3, C3, and H3, sRGB conversion means 28 for obtaining color corrected image data S4 comprising color data R4, G4, and B4 by converting the color corrected data L4, C4 and H4 into an sRGB color space which is a color space for monitor display, printing conversion means 29 for obtaining print image data S5 by converting the color corrected image data S4 into a color space for printing, LUT generating means 30 for generating the 3DLUT based on the image data S0 and the print image data S5, and processing method determining means 33 for determining whether the image processing conditions or the 3DLUT are output to the processing means 10. The color correction means 27 is connected to color correction condition setting means 32 for setting the color correction conditions used by the color correction means 27. The color correction condition setting means 32 reads the color correction conditions corresponding to both the setting information H0 and the input from the input means 8 from a memory 31 storing a plurality of reference color correction condition setting menus representing color correction conditions used as references and model color correction condition setting menus representing color correction conditions corresponding to models of digital camera. The color correction condition setting means 32 customizes the color correction conditions if necessary, and inputs the conditions to the color correction means 27.

$Pr=R0/255$ $Pg=G0/255$ $Pb=B0/255$ (1)

$R0'=((Pr+0.099)/1.099)^{2.222}$ $G0'=((Pg+0.099)/1.099)^{2.222}$ (if $Pr, Pg, Pb \geq 0.081$)

$B0'=((Pb+0.099)/1.099)^{2.222}$ (2)

$R0'=Pr/4.5$ $G0'=Pg/4.5$ (if $Pr, Pg, Pb<0.081$)

$B0'=Pb/4.5$ (3)

The memory 24 stores reference tone curves comprising tone curves for the standard situation, cloudy weather, backlight, and flash photographing, as well as tone curves corresponding to models of digital camera.

Figure 3:
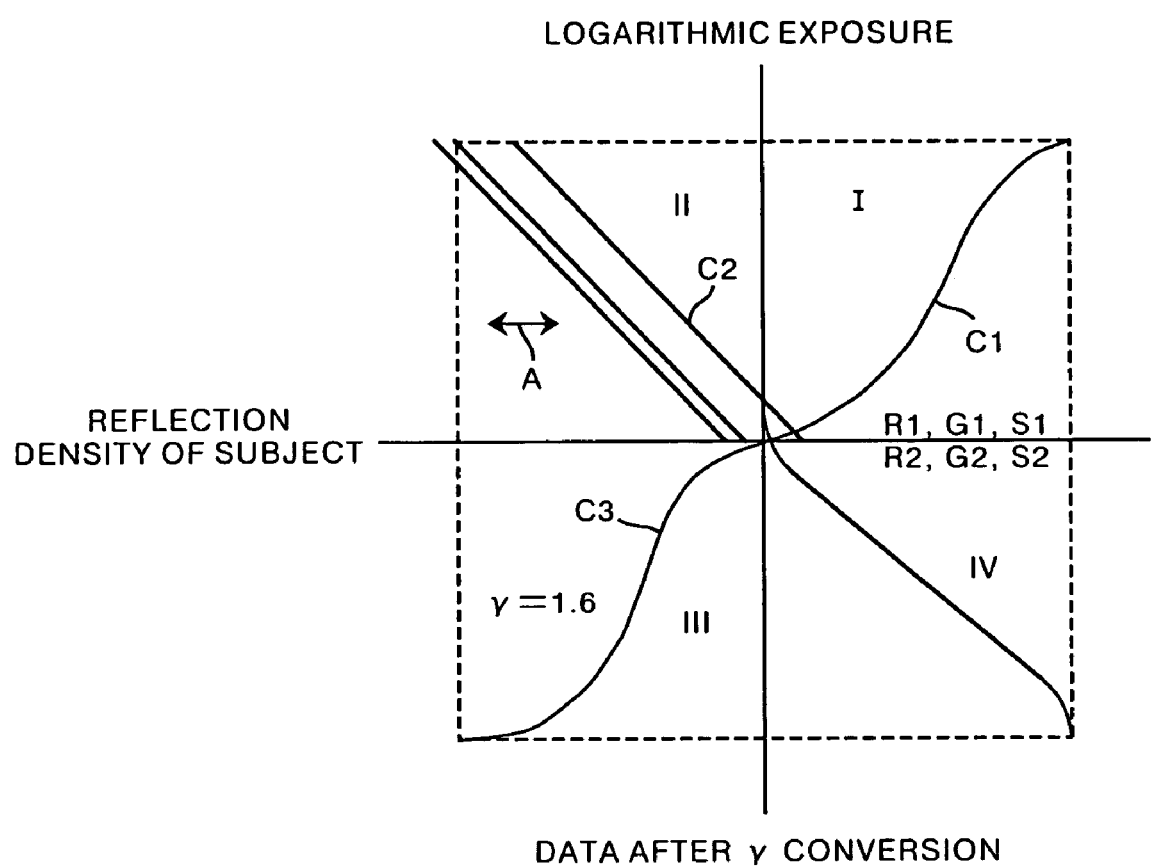
FIG. 3 is a diagram explaining setting of a tone conversion table.
Figure 4:
FIG. 4 shows tables of color correction condition setting menus.

The tone conversion tables T0 are set by the tone setting means 23, in order to convert tones of the image data S1 in the following manner. FIG. 3 is a diagram for explaining how the tone conversion tables T0 are set. The tone conversion tables T0 generate the color data R2, G2, and B2 comprising the image data S2 by the tone conversion of the color data R1, G1, and B1 comprising the image data S1 according to first to fourth quadrants in FIG. 3. In the tone setting means 23, the tone conversion tables T0 are set for each of the RGB colors. First, the setting information H0 is input to the tone setting means 23, and one of the tone curves corresponding to the model of the digital camera is read from the memory 24 based on the information on the model of the digital camera included in the setting information H0. Meanwhile, the reference tone curve for the standard situation is read from the memory 24 as a default of the reference tone curves. However, if reading the reference tone curve for cloudy weather or for backlight or for flash photographing is instructed by the input means 8, the corresponding tone curve is read from the memory 24.

A tone curve C1 corresponding to the model of the digital camera is set in the first quadrant as shown in FIG. 3. Since a quality of a reproduced image varies depending on a model or a manufacturer of a digital camera, the tone curve C1 has been generated for the model of the digital camera to absorb a tone characteristic of the camera. By using the tone curve C1, images of uniform quality can be obtained regardless of the model of the camera. By converting the color data R1, G1 and B1 based on the tone curve C1, data representing a logarithmic exposure value compensating the tone characteristic of the camera can be obtained.

A line C2 for correcting exposure is set in the second quadrant. The line C2 for exposure correction is basically a line passing through the origin. By translating the line C2 in directions shown by an arrow A based on the correction amount for exposure and white balance included in the setting information H0, the exposure is corrected. The AE/AWB processing appropriate for printing is carried out based on the line C2, and data representing reflection density of the subject are obtained.

A reference tone curve C3 is set in the third quadrant. In this example, the reference tone curve C3 for the standard situation is set. The reference tone curve C3 has an "S"-like shape and a middle portion thereof corresponds to the case of $\gamma=1.6$. In this embodiment, the conversion by the reference tone curve C3 is called $\gamma$ conversion. By using the tone curve C3, density data appropriate for printing can be obtained.

A tone curve C4 for correcting the tones of the highlight portion and the shadow portion of the image to become nonlinear is set in the fourth quadrant. A correction amount for the tone curve C4 is determined by the correction amount of the highlight portion and the shadow portion included in the setting information H0. By using the tone curve C4, the color data R2, G2 and B2 comprising the image data S2 can be obtained.

The tone conversion tables T0 are changed by an input from the input means 8 or from the DCMY keys 9. C, M, and Y of the index images shown on the monitor 7 can be changed by pressing down the DCMY keys 9. Changes in C, M, and Y are converted into changes of densities of R, G, and B, and the tone conversion tables T0 are changed according to the changes in the densities. In other words, the changes of RGB densities are predetermined depending on how many times the DCMY keys 9 are pressed, and the densities are changed by pressing the DCMY keys 9. More specifically, by translating the line C2 in the directions shown by the arrow A in the second quadrant based on how many times the DCMY keys are pressed, the densities of R, G, and B are changed. Furthermore, the tone curve C1 in the first quadrant or $\gamma$ of the tone curve C3 in the third quadrant is changed by the input from the input means 8. In this case, the tone curves C1 and C3 for each of the colors are displayed together with the index images on the monitor 7, and a user changes the tone curves C1 and C3 as desired with the input means 8 while viewing the index images. By changing the tone curve C1, the line C2 and/or the tone curve C3, the tone conversion tables T0 are set.

The tone conversion means 22 obtains the image data S2 by converting the image data S1 based on the tone conversion tables T0 set by the tone setting means 23.

Processing in the logarithmic conversion means 21, the tone conversion means 22, and the inverse logarithmic conversion means 25 is carried out in an RGB color space.

The LCH conversion means 26 converts the image data S3 from the RGB color space into an L*a*b* color space, and obtains the data L3, C3, and H3 representing the lightness L*, the chroma C*, and the hue angle HA. Hereinafter, this conversion will be explained. Since the image data S0 obtained by the digital camera are according to ITU-R BT.709 (REC 709), the color data R3, G3, and B3 comprising the image data S3 are converted into CIE1931 tristimulus values X, Y, and Z based on the following Equation (4):

$X$ $R3$ $Y=|A|G3$ $Z$ $B3$ (4)

Here, the matrix |A| is a matrix for converting the color data R3, G3, and B3 into the tristimulus values X, Y, and Z, and the following values can be used, for example:

0.4124 0.3576 0.1805

|A|=0.2126 0.7152 0.0722

0.0193 0.1192 1.0571 (5)

Instead of the matrix |A|, a look-up table may be used to find the tristimulus values X, Y, and Z.

CIE1976 L*(=L3), C*(=C3), and HA (=H3) are found from the tristimulus values X, Y, and Z, based on Equations (6)~(8) below:

$a^*=500\{f(X/Xn)-f(Y/Yn)\}$ $b^*=200\{f(Y/Yn)-f(Z/Zn)\}$ $L^*=116(Y/Yn)^{1/3}-16$ (if $Y/Yn>0.008856$)

$L^*=903.25(Y/Yn)$(if $Y/Yn \leq 0.008856$) (6)

If $X/Xn, Y/Yn, Z/Zn>0.008856$, $f(a/an)=(a/an)^{1/3}(a=X, Y, Z)$

If $X/Xn, Y/Yn, Z/Zn \leq 0.008856$, $$f(a/an) = 7.787(a/an) + 16/116$$

Xn, Yn, and Zn are tristimulus values for white and can be substituted by tristimulus values corresponding to CIE-D65 (a light source whose color temperature is 6500 K.).

$$C^* = (a^{*2} + b^{*2})^{1/2} \quad (7)$$

$$HA = \tan^{-1}(b^*/a^*) \quad (8)$$

The color correction means 27 corrects lightness, chroma and hue of eleven colors, namely R, G, B, C, M, Y, YellowGreen (YG), BlueSky (BS), a skin color SK (HL) in the highlight portion, a skin color SK(MD) having an intermediate density, and a skin color SK(SD) in the shadow portion. More specifically, the corrected data L4, C4, and H4 are obtained by correcting the data L3, C3 and H3 according to Equations (9)~(11) below:

$$L4 = L3 - \Delta L$$

$$\Delta L = \Sigma LPi\ Wi + \Sigma LPj\ Wj + \Delta l\ Wj \quad (9)$$

$$C4 = C3 - \Delta C$$

$$\Delta C = \Sigma CPi\ Wi + \Sigma CPj\ Wj + \Delta c\ Wj \quad (10)$$

$$H4 = H3 - \Delta H$$

$$\Delta H = \Sigma HPi\ Wi + \Sigma HPj\ Wj + \Delta h\ WJ \quad (11)$$

where ΔL: a correction value for the lightness,
ΔC: a correction value for the chroma,
ΔH: a correction value for the hue,
i: R, G, B, C, M, Y, YG, BS,
j: SK(HL), SK(MD), SK(SD),
LPi, LPj: correction degrees in the lightness,
CPi, CPj: correction degrees in the chroma,
HPi, HPj: correction degrees in the hue,
Wi, Wj: intensity functions,
Δl: a lightness change caused by tone conversion,
Δc: a chroma change caused by tone conversion, and
Δh: a hue change caused by tone conversion.

The lightness correction degrees LPi and LPj, the chroma correction degrees CPi and CPj, and the hue correction degrees HPi and HPj are provided by the color correction condition setting means 32. The color correction condition setting means 32 selects a desired one of reference color correction conditions in the reference color correction condition setting menu and one of model color correction conditions in the model color correction condition setting menu corresponding to the model of the digital camera read from the reference color correction condition setting menus and the model color correction condition setting menus stored in the memory 31. The color correction condition setting means 32 customizes the color correction conditions if necessary, and inputs the conditions to the color correction means 27. When the setting information H0 is input to the color correction condition setting means 32, the model color correction condition setting menu corresponding to the model of the digital camera is read from the memory 31 based on the information on the model of the digital camera included in the setting information H0. Meanwhile, a reference color correction condition setting menu for the standard situation is read from the memory 31 as a default menu. In the case where reading a color correction condition setting menu for cloudy weather or for backlight or for flash photographing is specified by the input means 8, a color correction condition setting menu therefor is read from the memory 31.

The reference color correction condition setting menu and the model color correction condition setting menu can be customized by changing the selected conditions as desired with the input means 8. The reference color correction condition setting menu and the model color correction condition setting menu may be stored in the memory 31 by being classified according to users, such as "a cloudy-weather reference color correction condition setting menu for user A" and "a cloudy-weather model color correction condition setting menu for digital camera A of user A".

The color correction condition setting menus have a plurality of values representing how much the lightness, the chroma and the hue need to be changed. The color correction means 27 sets the lightness correction degrees LPi and LPj, the chroma correction degrees CPi and CPj, and the hue correction degrees HPi and HPj in Equations (9)~(11) according to the values set in the reference color correction condition setting menu and the model color correction condition setting menu. The correction degrees in each color are obtained by adding the corresponding values in the reference color correction condition setting menu and the model color correction condition setting menu.

The intensity functions are found according to Equation (12) below:

$$Wi = F(d)$$

$$\text{where } d = ((Li - L)^2 + (ai - a)^2 + (bi - b)^2))^{1/2} \quad (12)$$

Figure 5:
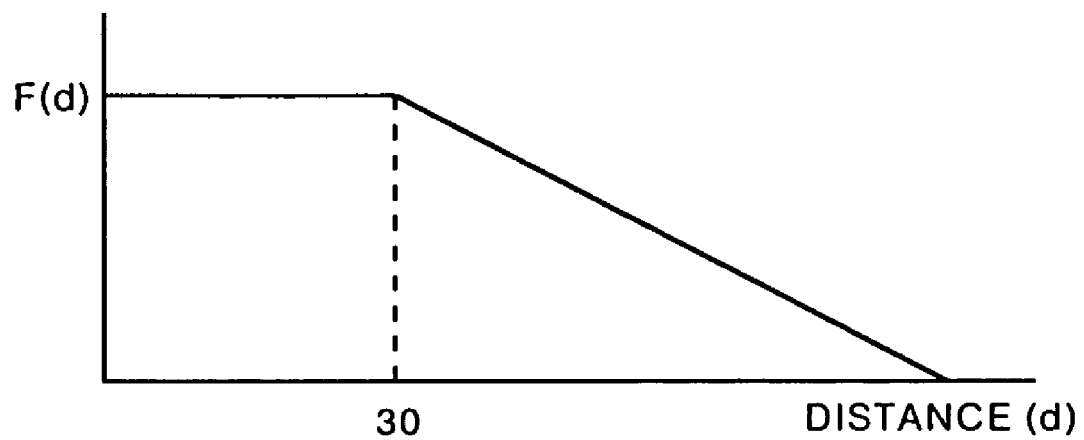
FIG. 5 is a diagram showing an example of an intensity function.

Li, ai, and bi refer to center colors of R, G, B, C, M, Y, YG, and BS in the L*a*b* color space. For R, G, B, C, M, and Y, the center colors refer to calorimetric values of the colors in the Macbeth Color Checker registered by Macbeth A Division of Kallmorgen Co. For YG and BS, the center colors refer to average calorimetric values of vegetation and sky in the image represented by the image data S0. d is a distance in the L*a*b* color space between the center color Li, ai, and bi of each of the colors and the values of L*, a*, and b* obtained by the LCH conversion means 26. F(d) is a function such that F(d) is constant up to a predetermined value of d (30 in this example) and decreases if d becomes larger than the predetermined value, as shown in FIG. 5.

Figure 6:
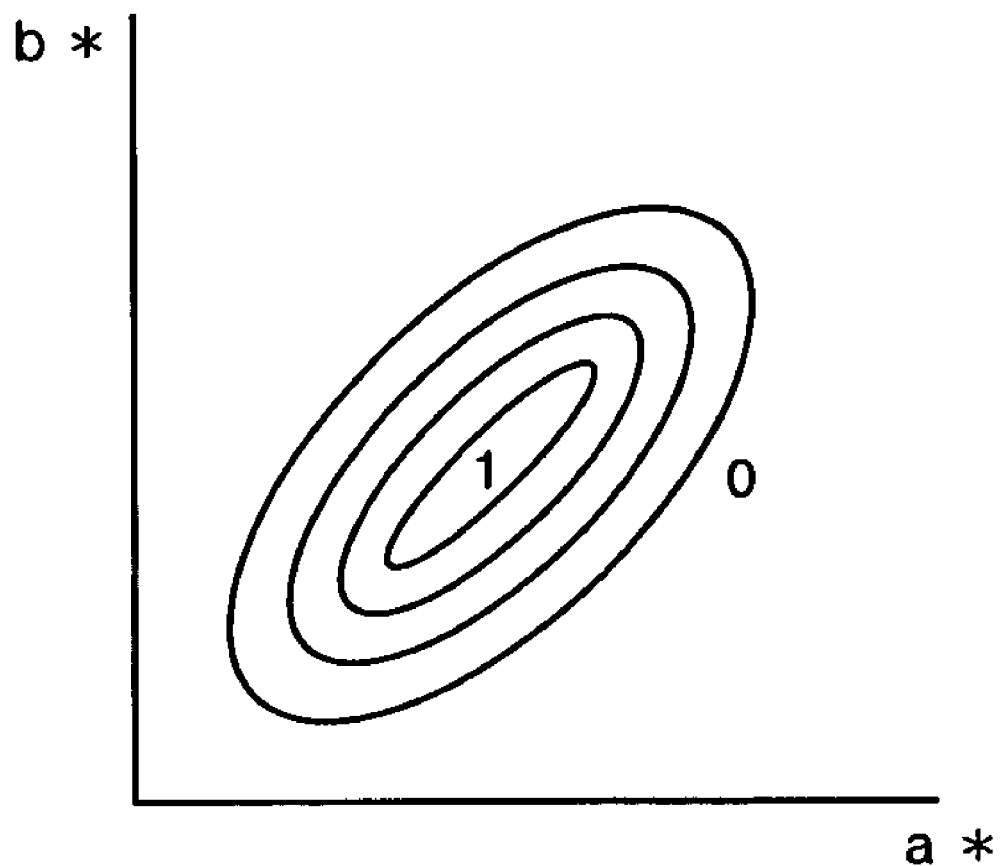
FIG. 6 is a diagram showing an example of an intensity function for a skin color.

Meanwhile, the intensity function Wj is a function for skin color. Statistical distribution ranges of the skin colors SK(HL), SK(MD) and SK(SD) of the image represented by the image data S0 in the L*a*b* color space are found, and the skin color function W(j) [0≦Wj≦1] is set in such a manner that the value of the function is small in a peripheral area and large at a center area in the distributions, as shown in FIG. 6.

Figure 7:
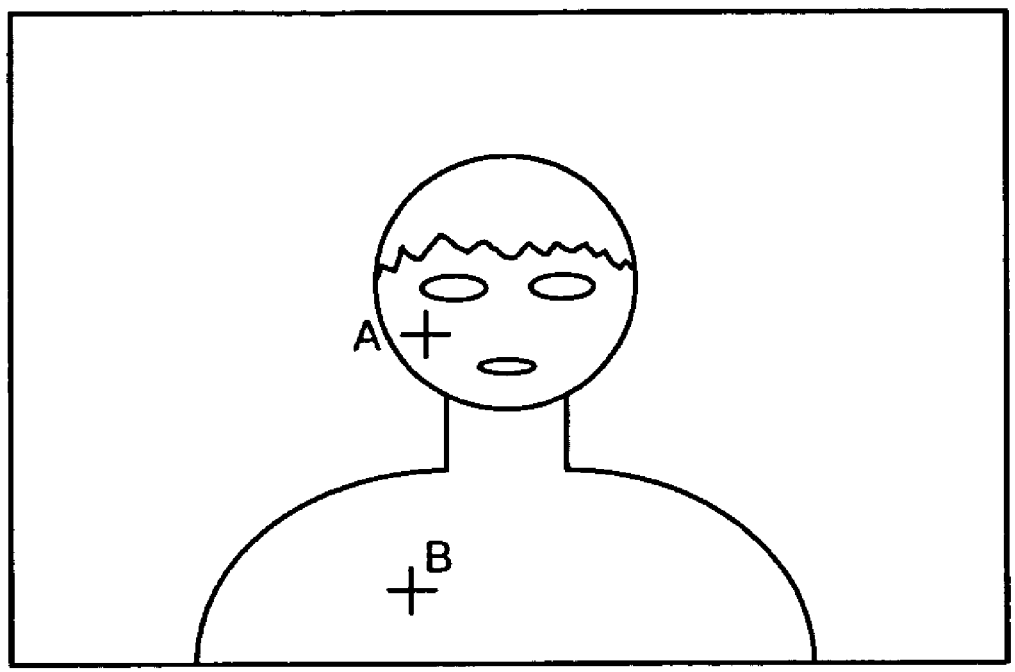
FIG. 7 shows an index image displayed on a monitor.
Figure 8:
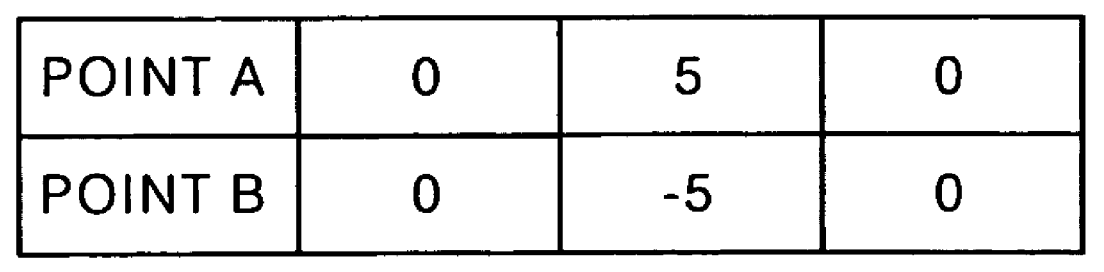

As shown in FIG. 7, in any one of the index images shown on the monitor 7, any color other than R, G, B, C, M, Y, YG, BS, SK(HL), SK(MD), and SK(SD) maybe specified so that correction degrees for the color as the center color can be reflected in Equations (9) to (11). In this case, if points A and B in FIG. 8 are specified, colors in 5×5 pixel ranges whose centers are positioned at A and B are found, and a color correction condition setting menu for the colors is set as shown in FIG. 8. From Equations (9)~(11), the corrected data L4, C4, and H4 are then found.

Δl, Δc, and Δh represent how much the lightness, the chroma, and the hue of the skin color are changed according to the nonlinear tone conversion set in the fourth quadrant by the tone setting means 23, and are found in the following manner. Based on the color data R1, G1, and B1 before the tone conversion and based on the color data R2, G2, B2 after the tone conversion, changes $\Delta L^*$, $\Delta C^*$, and $\Delta HA$ of the lightness $L^*$, the chroma $C^*$, and the hue angle HA are found for each pixel by carrying out the processing according to Equations (4)~(8) and the processing by the inverse logarithmic conversion means 25. The changes $\Delta L^*$, $\Delta C^*$, and $\Delta HA$ are multiplied by the intensity function Wj shown in FIG. 6 as in Equations (13)~(15) below, and $\Delta l$, $\Delta c$, and $\Delta h$ are found:

$$\Delta l = \Delta L^* \times Wj \quad (13)$$

$$\Delta c = \Delta C^* \times Wj \quad (14)$$

$$\Delta h = \Delta HA \times Wj \quad (15)$$

The sRGB conversion means 28 finds a* and b* after the correction by solving Equations (7) and (8) by using the corrected data L4, C4 and H4. The sRGB conversion means 28 then finds tristimulus values X5, Y5, and Z5 after the correction by solving Equation (6) by using a* and b* after the correction and by using $L^*$. The tristimulus values X5, Y5, and Z5 are then converted into color data R4', G4' and B4' according to Equation (16) below:

$$\begin{bmatrix} R4' \\ G4' \\ B4' \end{bmatrix} = |A|^{-1} \begin{bmatrix} X5 \\ Y5 \\ Z5 \end{bmatrix} \quad (16)$$

The color data R4, G4, and B4 are then found by using the following Equation (17), and the data are used as the color corrected image data S4 in the sRGB color space for monitor display:

$$R4 = 255 \times (1.055 R4'^{1.0/2.4} - 0.055)$$

$$G4 = 255 \times (1.055 G4'^{1.0/2.4} - 0.055)$$

$$B4 = 255 \times (1.055 B4'^{1.0/2.4} - 0.055) \text{ (if } 0.00304 \leq R4', G4', B4' \leq 1)$$

$$R4 = 255 \times 12.92 R4'$$

$$G4 = 255 \times 12.92 G4' \text{ (if } 0 \leq R4', G4', B4' < 0.00304)$$

$$B4 = 255 \times 12.92 B4' \quad (17)$$

The processing method determining means 33 calculates the number of the lattice points of the 3DLUT used for the tone conversion and the color correction of the image data S0, by using the number of bits of the image data S0. The calculated number of the lattice points of the 3DLUT is compared with the number Y0 of the pixels of the image represented by the image data S0. If the number of the lattice points is equal to or larger than the number of the pixels, the 3DLUT is not generated and the image processing conditions comprising the tone conversion tables T0 and the color correction conditions ($\Delta L$, $\Delta C$, and $\Delta H$ in Equations (9) to (11)) are output to the processing means 10 (the procedure shown by a dashed line). On the other hand, if the number of the lattice points is smaller than the number Y0 of the pixels, the procedure goes to the processing to generate the 3DLUT (the processing by the printing conversion means 29 and the LUT generating means 30).

The printing conversion means 29 obtains the print image data S5 by converting the color corrected image data S4 according to a 3DLUT for converting the color corrected image data S4 in the sRGB color space into a color space for printing.

The LUT generating means 30 finds a relationship between the color data R0, G0, and B0 comprising the image data S0 and the color data R5, G5, and B5 comprising the print image data S5 for each of the RGB colors, and uses the relationship as the three-dimensional look-up table (3DLUT) having $33^3$ data to be output to the processing means 10.

The index image data S11 are input to the image processing condition determining means 6, and the tone conversion processing is carried out thereon. For the index image data S11, the number of bits is not reduced and only the tone conversion processing using the tone conversion tables T0 is carried out by the tone conversion means 22. The color correction processing by the color correction means 27 is not carried out thereon, and the index image data are converted into the sRGB color space to be output as the index image data S11' after the tone conversion processing. At this time, since the index image data S11 are not used for generating the 3DLUT, the tone conversion means 22 sequentially carries out the tone conversion on the index image data S11 according to the tone conversion tables T0 sequentially set by the tone setting means 23 while reflecting the hit of the DCMY keys 9 or the density changes caused by the correction in the tone curves, and outputs the index image data S11'. In this manner, the index images whose tones have been corrected can be displayed in real time on the monitor 7.

The color correction processing may also be carried out on the index image data S11 in addition to the tone conversion processing. In this manner, the index images whose tones have been converted and whose colors have been corrected can be displayed on the monitor 7 in real time.

The 3DLUT or the image processing conditions generated or determined by the image processing condition determining means 6 in FIG. 1 are input to the processing means 10. If the 3DLUT is input to the processing means 10, the image data S0 are converted according to the 3DLUT, and the converted image data S12 are obtained. At this time, since the 3DLUT comprises the $33^3$ data, color data comprising the converted image data S12 are found by volume interpolation or area interpolation of the 3DLUT, as has been described in Japanese Unexamined Patent Publication No. 2(1990)-87192, for example.

Meanwhile, if the image processing conditions comprising the tone conversion tables T0 and the color correction conditions are input to the processing means 10, the tone conversion and the color correction are carried out on each of the pixels in the image data S0 by using the image processing conditions, and the image data S0 are converted into the converted image data S12 for printing.

The number of pixels of the digital camera that obtained the image data S0 varies, and may be smaller or larger than the number of pixels necessary for printing. Therefore, if the number of the pixels in the image data S0 is larger than the pixels necessary for printing, the reduction means 11 reduces the image data S0 before the processing by the processing means 10 and obtains the reduced image data S0'. The reduced image data S0' are converted into the converted image data S12. On the other hand, if the number of pixels is smaller than needed, the converted image data S12 obtained by the processing means 10 are enlarged by the enlargement means 12, and the enlarged image data S12' are obtained.

The sharpness processing means 13 carries out sharpness processing on the converted image data S12, or on the enlarged image data S12' according to Equation (18) below, and obtains the processed image data S13. In Equation (18), the sharpness processing is carried out on the converted image data S12.

$$S13 = S12 + \beta(S12 - S12us) \tag{18}$$

where S12us is unsharp image data of the converted image data S12, and $\beta$ is an enhancement factor.

The enhancement factor $\beta$ may be changed according to a reduction ratio used by the reduction means 11 or an enlargement ratio used by the enlargement means 12.

Figure 9:
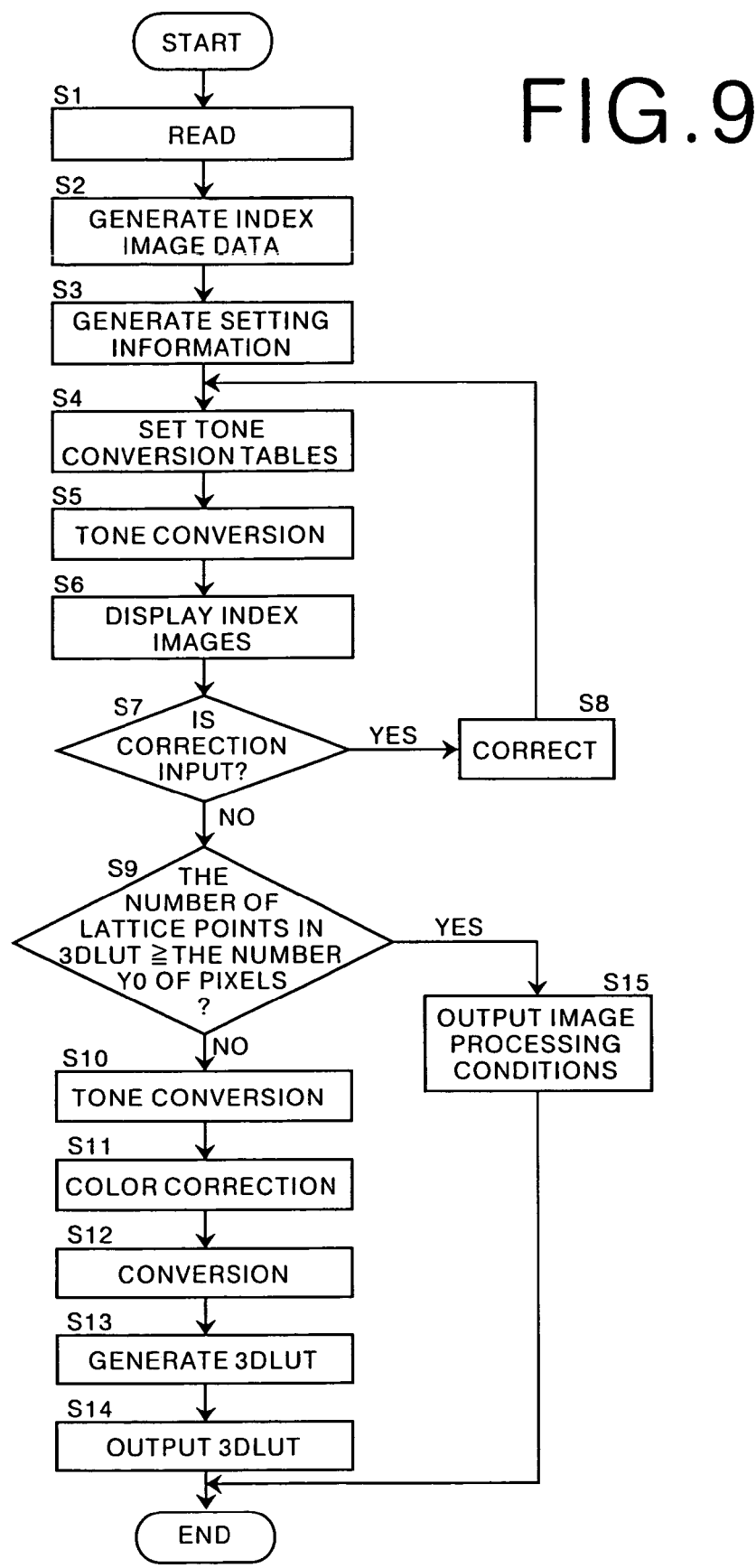
FIG. 9 is a flow chart showing operation of this embodiment.

Operation of this embodiment will be explained next. FIG. 9 is a flow chart showing the operation of this embodiment. The image data S0 obtained by photographing with the digital camera are read from the memory card 2 by the reading means 3 (Step S1) The index image generating means 4 generates the index image data S11 representing the index images of the image data S0 (Step S2), and inputs the index image data S11 to the image processing condition determining means 6. Meanwhile, the setting information generating means 5 generates the setting information H0 (Step S3), and inputs the setting information H0 to the image processing condition determining means 6.

The tone setting means 23 of the image processing condition determining means 6 sets the tone conversion tables T0 for converting the image data S0 according to the setting information H0 (Step S4), and the tone conversion means 22 carries out the tone conversion on the index image data S11 based on the tone conversion tables T0 (Step S5). The index images without color correction are then displayed on the monitor 7 (Step S6). An operator views the index images, and, if necessary (Step S7: YES), carries out the input by using the input means 8 or the DCMY keys 9 (Step S7). The tones and/or the densities of the index images are then corrected (Step S8). The procedure returns to Step S4 and the processing from Step S4 to Step S6, in which the tone conversion tables T0 are newly set for the corrected tones and/or the densities and the index image data S11 are subjected to the tone conversion according to the newly set tone conversion tables T0 to be displayed on the monitor 7, is repeated.

If no correction is carried out, or when the correction is completed, a result at Step S7 becomes negative. The number of the lattice points of the 3DLUT calculated based on the number of bits of the image data S0 is compared with the number Y0 of the pixels in the image represented by the image data S0 (Step S9). If the number of the lattice points of the 3DLUT is equal to or larger than the number Y0 of the pixels (Step S9: YES), the image processing conditions (the tone conversion tables T0 and the color correction conditions) are input to the processing means 10 (Step S15). If the number of the lattice points is smaller than the number Y0 of the pixels (Step S9: NO), the tone conversion is carried out on the image data S0 according to the tone conversion tables T0 set finally (Step S10), and the color correction is then carried out (Step S11). The conversion to the sRGB color space and the conversion to the color space for printing are also carried out (Step S12) and the print image data S5 are obtained. The LUT generating means 30 generates the 3DLUT (Step S13) by finding the relationship between the image data S0 and the print image data S5 for each of the RGB colors. The 3DLUT is output to the processing means 10 (Step S14).

As has been described above, the processing means 10 obtains the converted image data S12 by converting the image data S0 according to the 3DLUT, if the 3DLUT is input thereto. However, if the image processing conditions comprising the tone conversion tables T0 and the color correction conditions are input, the processing means 10 obtains the converted image data S12 by carrying out the tone conversion and the color correction on each of the pixels of the image data S0 according to the image processing conditions.

The converted image data S12 are then subjected to the sharpness processing by the sharpness processing means 13, and output as the print P from the printer 14.

The image data S0 read from the memory card 2 are subjected to the reduction processing by the reduction means 11 if necessary, and the reduced image data S0' are obtained. In this case, the reduced image data S0' are used as the image data S0 described above, and the same processing as has been described above is carried out thereon. Meanwhile, if enlargement is necessary, the converted image data S12 obtained from the image data S0 are enlarged by the enlargement means 12, and the enlarged image data S12' are obtained. The same processing is then carried out on the enlarged image data S12' as has been described above.

As has been described above, in this embodiment, the 3DLUT used for carrying out the tone conversion processing and the color correction processing on the image data S0 obtained by the digital camera is generated, and the processed image data S13 are obtained by converting the image data S0 according to the 3DLUT. Therefore, appropriate tone conversion processing and color correction processing can be carried out, and the processed image data S13 enabling reproduction of the image in a higher quality can be obtained.

Since the 3DLUT is generated for each of the models of digital cameras, the processed image data S13 enabling reproduction of the high quality image not affected by the tone processing carried out in the digital camera can be obtained, regardless of the model of the digital camera.

Furthermore, by determining the number of the lattice points in accordance with the number of bits of the image data S0, operation time for generating the 3DLUT and accuracy of operation for interpolating the lattice points at the time of converting the image data S0 can be controlled. In this manner, fast or accurate conversion of the image data S0 can be carried out.

Moreover, the 3DLUT is generated in the case where the number Y0 of the pixels of the image represented by the image data S0 is larger than the number of the lattice points in the 3DLUT, and the tone conversion processing and the color correction processing is carried out according to the 3DLUT. In the case where the number Y0 of the pixels is equal to or smaller than the number of the lattice points, the tone conversion processing and the color correction processing is carried out on each of the pixels. In this manner, the tone conversion processing and the color correction processing can be carried out on the image data S0 with a smaller amount of calculation.

In the above embodiment, the image output apparatus reads the image data S0 from the memory card 2. However, the present invention is applicable to a system in which image data are received from a transmitting apparatus via a network such as a LAN or WAN.

What is claimed is:

1. An image processing method for obtaining processed image data by carrying out tone conversion processing and color correction processing on image data obtained by a digital camera, the image processing method comprising the steps of:

generating a three-dimensional look-up table for carrying out the tone conversion processing and the color correction processing simultaneously on the image data;

obtaining the processed image data by converting the image data according to the three-dimensional look-up table; and setting a number of lattice points in the three-dimensional look-up table according to a number of bits of the image data.

2. An image processing method for obtaining processed image data by carrying out tone conversion processing and color correction processing on image data obtained by a digital camera, the image processing method comprising the steps of:

generating a three-dimensional look-up table for carrying out the tone conversion processing and the color correction processing simultaneously on the image data;

obtaining the processed image data by converting the image data according to the three-dimensional look-up table;

comparing the total number of pixels in an image represented by the image data with the number of lattice points in the three-dimensional look-up table;

the step of generating the three-dimensional look-up table being a step of generating the three-dimensional look-up table in the case where the total number of the pixels is larger than the number of the lattice points; and the step of obtaining the processed image data being a step of obtaining the processed image data by converting the image data according to the three-dimensional look-up table in the case where the total number of the pixels is larger than the number of the lattice points, and by carrying out the tone conversion processing and the color correction processing on each of the pixels in the image represented by the image data in the case where the total number of the pixels is equal to or smaller than the number of the lattice points.

3. An image processing method for obtaining processed image data by carrying out tone conversion processing and color correction processing on image data, the image processing method comprising the steps of:

comparing a number of lattice points in a three-dimensional look-up table used for carrying out the tone conversion processing and the color correction processing on the image data with the total number of pixels in an image represented by the image data;

generating the three-dimensional look-up table and obtaining the processed image data by converting the image data according to the three-dimensional look-up table in the case where the total number of the pixels is larger than the number of lattice points; and obtaining the processed image data by carrying out the tone conversion processing and the color correction processing on each of the pixels in the image represented by the image data, in the case where the total number of the pixels is equal to or smaller than the number of the lattice points.

4. An image processing method as defined in claim 3, further comprising a step of setting the number of lattice points in the three-dimensional look-up table according to the number of bits of the image data.

5. An image processing apparatus for obtaining processed image data by carrying out tone conversion processing and color correction processing on image data obtained by a digital camera, the image processing apparatus comprising:

three-dimensional look-up table generating means for generating a three-dimensional look-up table used for carrying out the tone conversion processing and the color correction processing simultaneously on the image data, wherein the three-dimensional look-up table generating means sets the number of lattice points of the three-dimensional look-up table according to the number of bits of the image data; and processing means for obtaining the processed image data by converting the image data according to the three-dimensional look-up table.

6. An image processing apparatus for obtaining processed image data by carrying out tone conversion processing and color correction processing on image data obtained by a digital camera, the image processing apparatus comprising:

three-dimensional look-up table generating means for generating a three-dimensional look-up table used for carrying out the tone conversion processing and the color correction processing simultaneously on the image data;

processing means for obtaining the processed image data by converting the image data according to the three-dimensional look-up table;

the three-dimensional look-up table generating means being means for comparing the total number of pixels of an image represented by the image data with the number of lattice points in the three-dimensional look-up table, and for generating the three-dimensional look-up table if the total number of the pixels is larger than the number of the lattice points; and the processing means being means for obtaining the processed image data by converting the image data according to the three-dimensional look-up table if the total number of the pixels is larger than the number of the lattice points, and for obtaining the processed image data by carrying out the tone conversion processing and the color correction processing on each of the pixels of the image represented by the image data if the total number of the pixels is equal to or smaller than the number of the lattice points.

7. An image processing apparatus for obtaining processed image data by carrying out tone conversion processing and color correction processing on image data, the image processing apparatus comprising:

three-dimensional look-up table generating means for comparing a number of lattice points in a three-dimensional look-up table used for the tone conversion processing and the color correction processing on the image data with the total number of pixels in an image represented by the image data, and for generating the three-dimensional look-up table in the case where the total number of pixels is larger than the number of the lattice points; and processing means for obtaining the processed image data by converting the image data according to the three-dimensional look-up table in the case where the total number of the pixels is larger than the number of the lattice points, and for obtaining the processed image data by carrying out the tone conversion processing and the color correction processing on each of the pixels in the image represented by the image data, in the case where the total number of the pixels is equal to or smaller than the number of the lattice points.

8. An image processing method as defined in claim 7, wherein the three-dimensional look-up table generating means sets the number of the lattice points in the three-dimensional look-up table according to the number of bits of the image data.

9. A computer-readable recording medium storing a program to cause a computer to execute an image processing method for obtaining processed image data by carrying out tone conversion processing and color correction processing on image data obtained by a digital camera, the program comprising the procedures of:

generating a three-dimensional look-up table for carrying out the tone conversion processing and the color correction processing simultaneously on the image data;

obtaining the processed image data by converting the image data according to the three-dimensional look-up table; and setting the number of lattice points in the three-dimensional look-up table according to the number of bits of the image data.

10. A computer-readable recording medium storing a program to cause a computer to execute an image processing method for obtaining processed image data by carrying out tone conversion processing and color correction processing on image data obtained by a digital camera, the program comprising the procedures of:

generating a three-dimensional look-up table for carrying out the tone conversion processing and the color correction processing simultaneously on the image data;

obtaining the processed image data by converting the image data according to the three-dimensional look-up table;

comparing the total number of pixels in an image represented by the image data with the number of lattice points in the three-dimensional look-up table;

the procedure of generating the three-dimensional look-up table being the procedure of generating the three-dimensional look-up table in the case where the total number of the pixels is larger than the number of the lattice points; and the procedure of obtaining the processed image data being the procedure of obtaining the processed image data by converting the image data according to the three-dimensional look-up table in the case where the total number of the pixels is larger than the number of the lattice points, and by carrying out the tone conversion processing and the color correction processing on each of the pixels in the image represented by the image data in the case where the total number of the pixels is equal to or smaller than the number of the lattice points.

11. A computer-readable recording medium storing a program to cause a computer to execute an image processing method for obtaining processed image data by carrying out tone conversion processing and color correction processing on image data, the program comprising the procedures of:

comparing a number of lattice points in a three-dimensional look-up table used for carrying out the tone conversion processing and the color correction processing on the image data with the total number of pixels in an image represented by the image data;

generating the three-dimensional look-up table and obtaining the processed image data by converting the image data according to the three-dimensional look-up table in the case where the total number of the pixels is larger than the number of the lattice points; and obtaining the processed image data by carrying out the tone conversion processing and the color correction processing on each of the pixels in the image represented by the image data, in the case where the total number of the pixels is equal to or smaller than the number of the lattice points.

12. A computer-readable recording medium as defined in claim 11, the program further comprising a procedure of setting the number of lattice points in the three-dimensional look-up table according to a number of bits of the image data.

* * * * *